United States Patent [19]

Knapp

[11] 4,062,437

[45] Dec. 13, 1977

[54] CONVEYOR EQUIPMENT FOR SURFACE TREATMENT OF WORKPIECES

[75] Inventor: Rudolf Knapp, Schockingen, Germany

[73] Assignee: Otto Dürr, Stuttgart, Germany

[21] Appl. No.: 613,307

[22] Filed: Sept. 15, 1975

[30] Foreign Application Priority Data

Sept. 16, 1974 Germany ............................ 2444172

[51] Int. Cl.$^2$ ......................... B65G 47/24; B08B 3/02

[52] U.S. Cl. .................................... 198/344; 198/378; 118/53; 118/319; 134/66; 134/79; 134/134; 134/161

[58] Field of Search .................................... 134/66-68, 134/78-79, 104, 142, 133-134, 46, 48-49, 76-77, 152, 161, 171; 198/103, 344, 377-378; 118/53, 57, 319; 51/15 R, 15 HI

[56] References Cited

U.S. PATENT DOCUMENTS

| | | | |
|---|---|---|---|
| 2,730,068 | 1/1956 | Reynolds et al. | 134/81 X |
| 2,821,157 | 1/1958 | Boyd | 134/48 X |
| 2,874,820 | 2/1959 | Rabut | 198/103 X |
| 3,029,929 | 4/1962 | Kearney et al. | 134/142 X |
| 3,152,685 | 10/1964 | Heck | 134/66 X |
| 3,226,757 | 1/1966 | Shea | 134/81 X |
| 3,297,132 | 1/1967 | Ripple | 198/378 |
| 3,384,048 | 5/1968 | Kutcher | 118/319 X |
| 3,481,348 | 12/1969 | Schultz | 134/126 |
| 3,606,896 | 9/1971 | Holm | 134/79 |
| 3,607,546 | 9/1971 | Grealey | 134/79 X |
| 4,001,977 | 1/1977 | Schrader | 134/79 X |

*Primary Examiner*—Robert L. Bleutge

*Attorney, Agent, or Firm*—Michael J. Striker

[57] ABSTRACT

An arrangement for surface treating workpieces has a pair of rotary conveyors each rotatable about a respective vertical rotation axis and provided with a plurality of angularly spaced holders each of which can grip a respective workpiece and advance it angularly stepwise through a plurality of respective working stations. In addition each of these holders can be rotated about an axis generally radial of the respective rotation axis for the rotary conveyor for treatment on all sides of each workpiece as it is stepped through the various surface treatment stations. A line conveyor extends tangentially passed the two conveyors and is of the walking-beam type. This line conveyor feeds workpieces to the upstream conveyor so that they then move around the working stations of this upstream rotary conveyor, then takes them off the upstream rotary conveyor and feeds them to the downstream rotary conveyor where they are stepped through the respective working stations of this conveyor. Thereafter the completely treated workpieces are taken off the downstream rotary conveyor by the line conveyor.

16 Claims, 3 Drawing Figures

CONVEYOR EQUIPMENT FOR SURFACE TREATMENT OF WORKPIECES

BACKGROUND OF THE INVENTION

The invention relates to equipment for the surface treatment of workpieces, in particular for washing of metal parts by sprays with a conveyor device which moves the workpieces from station to station.

The invention is based above all on the objective to allow the intensive surface treatment, in particular an intensive washing of the total surface of a workpiece, without having the treatment interrupted by substantial pauses for transport of the workpiece or other substantial lost time intervals.

SUMMARY OF THE INVENTION

Thus the invention consists to a substantial part in that the conveyor equipment on the one hand has a conveyor device for transporting the workpieces in a line (hereinafter called "line conveyor" for short) and on the other hand has a conveyor arrangement which moves the workpieces through the stations for surface treatment in circles (hereinafter referred to as a rotary or circle conveyor), which are mutually interconnected by means of the line conveyor — preferably in an approximately tangential direction. The workpieces thus pass through the circle conveyor one after the other, by being transported from one to the other — preferably in an approximately tangential direction to the circular path of the conveyors. The lost time for the transport of each workpiece can be reduced to a minimum since during the time that the workpieces pass through the circle conveyor the treatment, and especially the washing, of the workpieces can take place substantially uninterruptedly. At the same time relatively little room as well as in particular a relatively small length are required in spite of the rather large transport distances for individual workpieces, since the treatment takes place mainly during the passage of the workpieces in the individual circular paths.

Particularly intensive treatment, as it is particularly required for a thorough washing of metal parts for industry, is achieved by a further characteristic of the invention in that the conveyor arrangement comprises at least one circle conveyor for effecting transport in a circle around a central axis and having holding fixtures for the workpieces by which the workpieces during their rotation about the above-mentioned central axes further rotate additionally about secondary axes which extend approximately radially to the above-mentioned primary on central axis. Sprays, which in this case are directed onto the workpiece, can reach substantially all parts of its surface and can clean even relatively inaccessible corners and angles of the workpiece.

In an arrangement having a plurality of circle conveyors and one line conveyor, the line conveyor, in a particularly advantageous embodiment of the invention, is embodied in a walking beam conveyor, the length of whose step corresponds preferably to one-half the distance between the take-up or output stations of the circular conveyors.

The present invention is particularly suitable for the purpose of equipping one of a plurality of circle conveyors linked by a line conveyor with means for washing and a subsequent one with means for drying, e.g by blowing by means of fans. The circle conveyor comprises in particular stations for washing by means of aimed sprays.

Advantageously, the circle conveyor comprises a pivot mounting having a perpendicular or substantially perpendicular axis of rotation as central axis, on which the holding fixtures are rotatably mounted in the form of a star with a horizontal or substantially horizontal axes of rotation. By the double rotation of the workpieces, on the one hand about the vertical axis and on the other hand about the horizontal axis, the workpieces can be reached from all sides with directed sprays so that a particularly thorough treatment, in particular washing of the workpieces can be achieved.

Advantageously, the pivot mounting and the holding fixtures are driven in such a manner in dependence upon each other, that during the movement of the pivot mounting through an angle corresponding to the angular distance of the holding fixtures from each other, that is corresponding to the number of divisions of the pivot mounting, the holding fixture completes one or a plurality of full rotations, while simultaneously the line conveyor is advanced by one step.

In a particularly advantageous embodiment of the invention, the pivot mounting of the circle conveyors comprises a ring mount which is braced on a bearing, preferably a ball bearing, and on which the bearings for the holding fixtures which are rotatable about approximately radial axes are arranged in the form of a star.

For taking the workpieces up in, or ejecting them from, the holding fixtures, advantageously, a clamping device driven by the drive of the line conveyor is provided.

In accordance with a further important characteristic of the invention, the holding fixture comprises a frame which is rotatably mounted for rotation about a horizontal or approximately horizontal axis of rotation, and a clamping bridge member on the frame positioned radially to its axis of rotation and slidably movable relative to the frame against the force of tension means — in particular springs — with supporting elements or stops on the holding fixture and on the clamping bridge member for receiving and ejecting the workpieces. The frame of the holding fixture for receiving the workpiece is further formed as a substantially U-shaped frame, whose legs serve to guide the also substantially U-shaped clamping bridge member and one of whose legs carries the pivot for the mounting in such a manner that the frame and the clamping bridge member allow the entry of the conveyor elements, preferably of walking beams, for the taking up and ejecting or further transport of a workpiece. In order to accomplish this, it is further advantageous that the clamping bridge member has detents, e.g. on guide rods, with which the operating elements of an ejection apparatus which is stationary relative to the rotary motion of the holding fixture cooperate in such a manner, that in a particular angular position of the holding fixture the clamping bridge member may be lifted by the operating elements against the force of the — in particular spring mounted — tension means for ejecting the workpieces.

BRIEF DESCRIPTION OF THE DRAWING

There is shown in

SPECIFIC DESCRIPTION OF A PREFERRED EMBODIMENT

The arrangement comprises on the one hand a line conveyor L and on the other hand for examples two circle conveyors K1 and K2, wherein the line conveyor L is positioned substantially tangentially to the circle conveyors. The circle conveyor K1 for example may serve for washing, the circle conveyor K2 for example for drying (blowing) of the workpieces, which are generally denoted by W.

The workpieces are, for example, transported to the treatment equipment by means of a gravity-roller conveyor 10, the roller conveyor serving to put a workpiece W onto the beginning of an in itself known walking beam conveyor serving as a line conveyor at a take-up location A. The workpiece is here gripped by the walking beam conveyor and is transported through the arrangement with the length of step S of the beams 11. The walking beam conveyor may comprise individual beams 11 to which, in addition to a lifting motion which, for example may be a circular movement with relatively small radius, is also simultaneously imparted a separate relatively large back and forth motion by hydraulic or pneumatic means, for example by means of a cylinder-piston unit.

Figure 1:
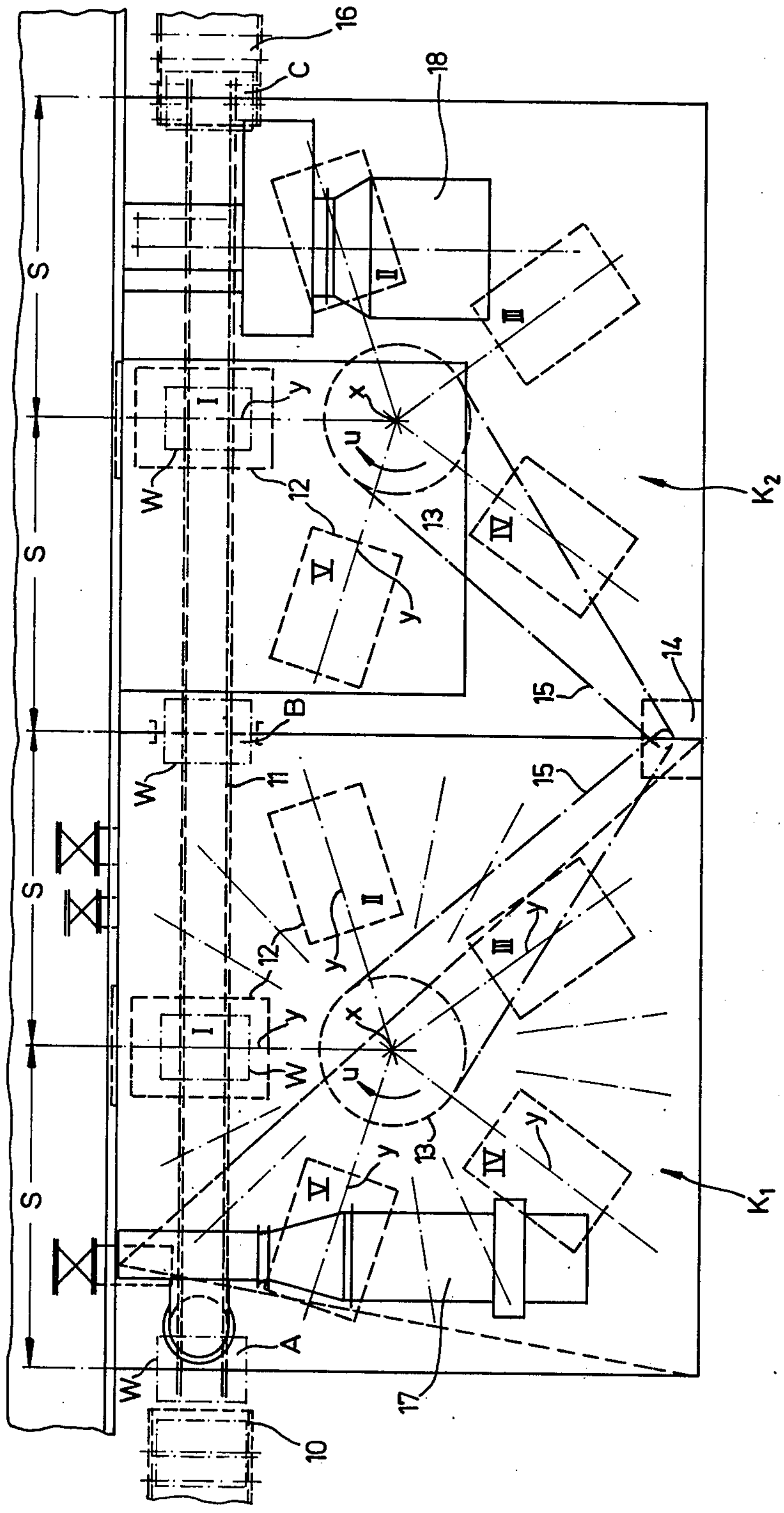
FIG. 1 a plan view of the arrangement of the present invention.

Each of the two circle conveyors K1 and K2 in the embodiment has five stations. Of course more or less stations, and possibly a different number of same in K1 and K2 may be provided, even if generally speaking the same arrangement for the circle conveyors is desirable and is particularly advantageous for commercial reasons. Workpieces W are clamped into the frames 12, the number of which in each circle conveyor corresponds to the number of stations in said conveyor and which are distributed in a star arrangement on a mounting — indicated in FIGS. 1 and 2 simply by a circle 13 — which is rotatable about a perpendicular axis *x*. Each of the holding fixtures 12 is in turn rotatably mounted for rotation about a horizontal axis Y on its pivot mounting in such a manner that the individual holding fixtures 12 rotate about their axes *y* simultaneously during the rotation of the pivot mounting in the direction of the arrow *u*. For example the drive for the pivot mounting and the holding fixture can be so chosen that the individual holding fixture 12 or the workpiece W mounted therein execute one rotation about the corresponding axis *y* during movement from one station to the next.

The circle conveyor K2 is built in a corresponding manner. The pivot mountings 13 of the two circle conveyors K1 and K2 may for example be driven by a common motor 14 by means of a chain drive 15 or the like. The individual holding fixtures 12 are preferably also coupled to this drive in that they are rotated by means of a gear rim of pivot mounting 13 in a fashion to be described in detail below. Beams 11 of the walking beam conveyor are also preferably driven in dependence upon the common drive, so that these are forced to execute a step-by-step lifting movement at a rate which corresponds to the angular velocity of pivot mounting 13. The workpiece W which was transferred at the take-up location A to the supply conveyor 10 is transported towards the circle conveyor K1 in the first operating phase of station I, where the workpiece — preferably automatically — is clamped into the holding fixture 12 by the lifting movement of beam 11 of the walking beam conveyor.

From this take-up and output station I, the workpiece is transported to station II by pivot mount 13 in a further operating phase. In station II for example a general prewash of the workpiece may take place while it is rotating about its axis *y*. After the prewashing the workpieces may be subjected to a directed washing by means of sprays in the stations III, IV and V into which they are transferred step-by-step, the washing taking place during the rotation about the axes *y*, the sprays being able to hit the workpieces in many different directions and thereby being able to reach even relatively inaccessible corners for the purposes of cleaning same.

In similar manner all stations are finally occupied one after the other during the passing of workpieces through stations I through V, so that a simultaneous treatment of all workpieces in the individual stations can take place.

As soon as one of the workpieces is rotated into station I from station V, it is ejected from its holding fixture 12 by means of beam 11 of the walking beam conveyor and is thereafter transported onto the transfer station B of the line conveyor L. Directly thereafter a further workpiece W is transported from the take-up location A by means of the walking beam converter to station I of the circle conveyor K1 and there, for example by lowering of the beam 11, is clamped into the previously emptied holding fixture 12. At this time the workpieces which are then present in station II through V may be subjected to predetermined intensive processing while, if desired, rotating about their axes *y*.

During transport of a workpiece by means of the beams of the line conveyor L from station I of circle conveyor K1 to the transfer station B, a workpiece which was located there previously may be simultaneously transported by a further step S by means of the beam 11 from transfer station B to the station I of the circle conveyor K2. The conveying process in circle conveyor K2 corresponds to that in circle conveyor K1, the workpieces being transported step-by-step from station I to stations II, III, IV and V and from there back again into station I on a pivot mounting which is rotatable about the vertical axis *x*, during which time the holding fixtures 12 for workpieces W are able to execute a rotation about their horizontal axes *y*. If desired, circle conveyor K2 can again be used for washing or for example for drying.

The workpiece W which has been released from station I of circle conveyor K2 is transported to a delivery station C by the line conveyor and may from there again reach a gravity roller conveyor 16, which transports the workpiece to any desired location. Of course it is also possible to connect one or more further circle conveyors to the circle conveyor K2, insofar as this is desired with respect to the posed requirements.

Any other conveyor arrangement can be used instead of the walking beam converter for the line conveying.

The spray arrangements for general and/or directed washing of the individual workpieces can be arranged and aimed arbitrarily and in accordance with the requirements. A suction arrangement 17 can remove the steam resulting from the washing from the chamber enclosing the circle conveyor K1, while, for example, a blower 18 is arranged for blowing in air under pressure, or such like, into the chamber for circle conveyor K2.

The transport in the circle conveyors generally takes place intermittently, the workpieces remaining within the individual stations for a particular time, if required with some movement in the transport direction, so that the workpieces in stations I may be on the one hand released and transported onward and on the other hand taken-up and clamped.

If required, a special drive may be supplied for the holding fixtures, which makes it possible that even when the pivot mounting 13 is stationary, the holding fixtures 12 insofar as they are in stations II to V, may be rotated about their axes *y*.

Figure 2:
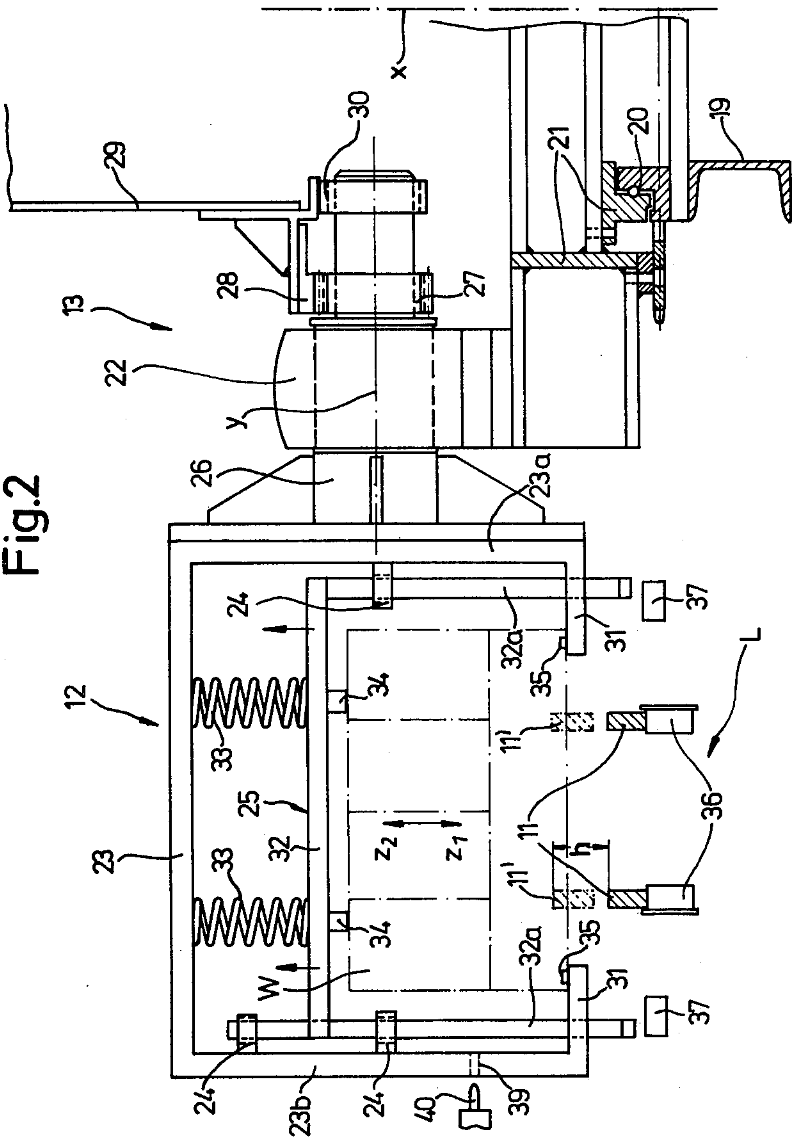
FIG. 2 a longitudinal view of the arrangement, partially in cross-section in the center plane of a circle conveyor, and FIG. 3 a view from the left of the holding fixture of FIG. 2.
Figure 3:
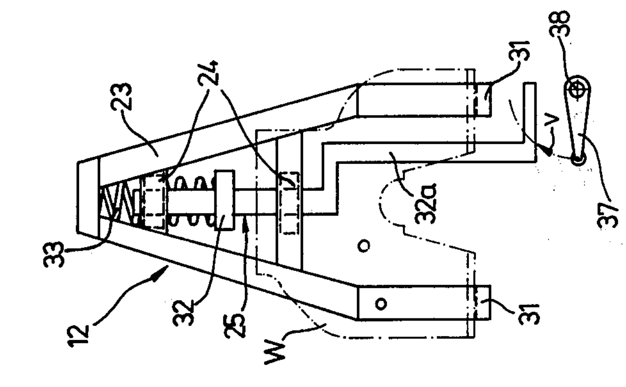

A particularly suitable circle conveyor for carrying out the invention in conjunction with a line conveyor operating in accordance with the walking beam system is shown in FIGS. 2 and 3.

Pivot mounting 13 comprises a ring bearing 21 having a plurality of sections and mounted for rotation about the vertical axis *x* and axially braced by means of ball bearing 20 on a, for example circular, support 19, the bearings 22 for the holding fixtures 12 being mounted therein in a star-shaped arrangement. These comprise in the main substantially U-shaped clamping frames 23 which as shown are open in the downward direction and on whose legs 23*a*, 23*b* are arranged sleeve bearings 24 for receiving a clamping bridge member 25 and which, on its leg 23*a*, carries a bearing or turning pin 26 which is reinforced thereby, for mounting in bearing 22. Turning pin 26 extends beyond bearing 22 and carries a gear 27 which engages a ring gear 28 on a fixed member 29. A bracket 30 at the end of bearing pin 26 serves to counteract the unilateral loads to which bearing 22 is subjected by the weight of the cantilevered holding fixture 12 and the workpiece W clamped therein.

The holding frame 23 of the holding fixture 12 is of V shape at both of its ends, as shown in FIG. 3. Its legs include inwardly pointed supporting arms for holding the workpiece W. The clamping bridge member 25 is also U-shaped in correspondence with the holding frame 23 and has an upper cross bar 32 and lateral or vertical legs forming push rods 32*a* by means of which the clamping bridge member 25 is mounted for slidable movement in the vertical direction *z*1, *z*2 in the bearings 24 of the holding frame 23 for clamping and disengaging the workpieces W and which is acted upon by the force of tension springs 33, which are interposed between the bar 32 of the clamping fixture and the bar of the holding frame 23 and which push the clamping fixture 32 against the workpiece by means of stops 34. In this condition the workpiece W is held fast between stops 34 of the clamping fixture 25 and the bearing arms 31 of the holding frame 23. Projections 35 on the bearing arms 31 or in other positions, for example on the fixture, can hold the workpiece in a fixed position so that falling of the workpiece out of the holding fixture 12 during its rotation about axis *y* is impossible.

Below holding fixture 12, which is to be thought of in the position shown in the Figure as being present in station I of a circle conveyor, are indicated the walking beams 11 of the line conveyor L which operates in accordance with a walking beam system. These are lifted by the lifting elements 36 step-by-step in suitable fashion, for example in such a manner that after lifting they reach the position 11' thereby lifting the workpiece W off the supporting arms 31. In order to allow this to be done and to cause the workpiece W to be unclamped before this time, unclamping levers 37 are provided which are operated by walking beams 11 or the lifting elements 36 of the walking beam conveyor. Unclamping levers 37, when rotating about their axes 38 in the direction of arrows *v*, are able to lift rods 32*a* formed by the legs of the clamping fixture 25 for such a distance that the stops 34 are lifted away from workpiece W thereby freeing same.

If a workpiece W is to be unclamped from holding fixture 12 and a new workpiece W is to be clamped therein, this takes place in the following way:

The workpiece W which is clamped in holding fixture 12 is unclamped by means of the lifting of the clamping fixture 25 by means of unclamping lever 37 and simultaneously the unclamped workpiece is transported in the direction of transport to transfer station B of the line conveyor by means of the walking beams 11 which are being lifted to position 11'. Simultaneously, a new workpiece W is transported to the holding fixture 12 by the following part of the walking beam 11 and is positioned by the walking beams from their location 11' onto the holding arms 31, if desired with fixed positioning by means of the positioning pins 35. The walking beams 11 descend again into the position shown in full lines and unclamping arms 37 at the same time free rods 32*a* of the clamping device 25, so that these, under the action of springs 33, clamp the workpiece W by means of the projections 34.

Thereafter, the workpiece can be transported through the circle conveyor concerned in the previously described manner, the holding fixture 12 together with the workpiece W rotating about the horizontal axis *y*. This rotation, in the illustrated embodiment of the invention, takes place simultaneously with the turning of the holding fixture about axis *x*, this being rotated about the axis *x* together with workpieces W. In this process the gears 27 mesh with ring gear 28 and thereby turn the holding fixtures 12 about the individual horizontal axes *y*.

If desired, a rotation of the holding fixture 12 about the axis *y* independent of the turning of the pivot mounting about the axis *x* can be provided, for example in that the gear 28 is independently driven about the axis *x*. A bore 39 in holding frame 23 can be provided to receive a bolt 40 which is axially slidable in the fixed wall of the chamber or such like in the desired angular position of the holding fixture 12 for effecting the clamping and unclamping of the workpiece W and thereby to fix the holding fixture in this angular position.

Further, the invention is not to be limited to the embodiment shown.

I claim:

1. An arrangement for surface treating workpieces, said arrangement comprising:

a rotary conveyor rotatable about a primary rotation axis;

a line conveyor having walking beams extending tangentially past said rotary conveyor;

means including a plurality of holders angularly spaced about said primary rotation axis on said rotary conveyor and each for holding a respective workpiece, each of said holders being rotatable on said rotary conveyor about a respective secondary rotation axis extending generally radially of said primary rotation axis, each holder including gripper means closable and openable for grasping and releasing a workpiece and including a support, a U-shaped frame having at least one leg engageable with at least one of said walking beams for displacement of said frame away from the respective support and constituting a gripper part displaceable generally radially of the respective secondary axis toward and away from the respective support, and a spring urging the respective gripper part toward the respective support;

means for rotating said rotary conveyor about said primary axis and thereby orbiting said holders and workpieces clamped thereby about said primary rotation axis; and means for rotating each of said holders about the respective secondary axis during rotation of said rotary conveyor about said primary rotation axis.

2. The arrangement defined in claim 1, further comprising means for displacing the gripper part of a holder away from the respective support for unclamping a workpiece held thereby in a predetermined angular position of said rotary conveyor.

3. The arrangement defined in claim 1, further comprising means for locking said rotary conveyor in any of a plurality of angularly offset positions.

4. An arrangement for surface treating workpieces, said arrangement comprising:

a rotary conveyor rotatable about a primary rotation axis;

means including a plurality of holders angularly spaced about said primary rotation axis on said rotary conveyor and each for holding a respective workpiece, each of said holders being rotatable on said rotary conveyor about a respective secondary rotation axis extending generally radially of said primary rotation axis, each holder including gripper means closable and openable for grasping and releasing a workpiece and including a support, a gripper part displaceable generally radially of the respective secondary axis toward and away from the respective support, and a spring urging the respective gripper part toward the respective support;

means for displacing the gripper part of a holder away from the respective support for unclamping a workpiece held thereby in a predetermined angular position of said rotary conveyor;

a line conveyor having means for displacing workpieces in a straight line tangentially past said rotary conveyor and including vertically displaceable walking beams engageable with said gripper parts and constituting part of said means for displacing said gripping part;

means for rotating said rotary conveyor about said primary axis and thereby orbiting said holders and workpieces clamped thereby about said primary rotation axis; and means for rotating each of said holders about the respective secondary axis during rotation of said rotary conveyor about said primary axis.

5. The arrangement defined in claim 4, wherein said primary axis is vertical and said secondary axes are horizontal.

6. The arrangement defined in claim 5, further comprising a plurality of work stations spaced angularly relative to said primary axis about said rotary conveyor, said means for rotating said holders including means for rotating each of said holders through at least one complete revolution as said rotary conveyor passes each holder from one of said stations to the next succeeding station.

7. The arrangement defined in claim 5, wherein said line conveyor displaces said workpieces in steps of constant predetermined length to a one of said stations for loading said workpieces stepwise onto said rotary conveyor, said means of said line conveyor operating synchronously with said means for rotating said rotary conveyor.

8. The arrangement defined in claim 4, wherein said rotary conveyor includes a non-rotatable ring mount and a carousel carrying said holders and rotatable on said ring mount.

9. The arrangement defined in claim 4, wherein said means for rotatable said holders is separate from said means for rotating said rotary conveyor and includes a gear centered on said primary axis.

10. The arrangement defined in claim 4, wherein two such rotary conveyors each having a respective plurality of such holders and means for rotating said conveyors and for rotating said holders are provided, said line conveyor extending in a straight line tangentially past the two rotary conveyors for feeding workpieces to the rotary conveyors and taking workpieces off the rotary conveyors, and said arrangement further comprising a plurality of work stations angularly spaced about each of said rotary conveyors.

11. The arrangement defined in claim 10, wherein said line conveyor is a walking beam conveyor.

12. The arrangement defined in claim 11, wherein said beam conveyor includes means for advancing said workpieces in steps having a length equal to approximately half the distance between adjacent sections of said rotary conveyors.

13. The arrangement defined in claim 4, wherein said means for rotating said holders, includes a fixed ring gear centered on the respective primary axis and a gear on each holder meshing with the respective ring gear and rotatable with the respective holder about the respective secondary axis.

14. The arrangement defined in claim 4, wherein each gripper part is U-shaped and slidable on the respective holder toward and away from the respective support.

15. An arrangement for surface treating workpieces, said arrangement comprising:

a rotary conveyor rotatable about a primary rotation axis;

means including a plurality of holders angularly spaced about said primary rotation axis on said rotary conveyor and each for holding a respective workpiece, each of said holders being rotatable on said rotary conveyor about a respective secondary rotation axis extending generally radially of said primary rotation axis, each holder including gripper means closable and openable for grasping and releasing a workpiece and including a support, a gripper part displaceable generally radially of the respective secondary axis toward and away from the respective support, and a biasing means for urging the respective gripper part toward the respective support;

means for displacing the gripper part of a holder away from the respective support for unclamping a workpiece held thereby in a predetermined angular position of said rotary conveyor;

conveyor means for displacing workpieces past said rotary conveyor, engageable with said gripper parts, and constituting part of said means for displacing said gripper part;

means for rotating said rotary conveyor about said primary axis and thereby orbiting said holders and workpieces clamped thereby about said primary rotation axis; and means for rotating each of said holders about the respective secondary axis during rotation of said rotary conveyor about said primary axis.

16. An arrangement for surface treating workpieces, said arrangement comprising:

a rotary conveyor rotatable about a primary rotation axis;

conveyor means extending tangentially past said rotary conveyor;

means including a plurality of holders angularly spaced about said primary rotation axis on said rotary conveyor and each for holding a respective workpiece, each of said holders being rotatable on said rotary conveyor about a respective secondary rotation axis extending generally radially of said primary rotation axis, each holder including gripper means closable and openable for grasping and releasing a workpiece and including a support, a frame having at least one leg engageable with said conveyor means for displacement of said frame away from the respective support and constituting a gripper part displaceable generally radially of the respective secondary axis toward and away from the respective support, and biasing means for urging the respective gripper part toward the respective support;

means for rotating said rotary conveyor about said primary axis and thereby orbiting said holders and workpieces clamped thereby about said primary rotation axis; and means for rotating each of said holders about the respective secondary axis during rotation of said rotary conveyor about said primary rotation axis.

* * * * *